(12) United States Patent
Tashiro et al.

(10) Patent No.: US 10,151,593 B2
(45) Date of Patent: Dec. 11, 2018

(54) TRAVEL TIME DATA PROCESSING APPARATUS, TRAVEL TIME DATA PROCESSING METHOD AND PROGRAM

(71) Applicants: TOYOTA JIDOSHA KABUSHIKI KAISHA, Toyota-shi (JP); AISIN AW CO., LTD., Anjo-shi (JP)

(72) Inventors: Hiroyuki Tashiro, Kitakyushu (JP); Yume Hosoya, Kitakyushu (JP); Motohiro Nakamura, Okazaki (JP); Tomoki Kodan, Nagoya (JP); Atsushi Ikeno, Minato-ku (JP); Yoshitaka Kato, Minato-ku (JP); Sadahiro Koshiba, Takahama (JP); Kazuteru Maekawa, Miyoshi (JP)

(73) Assignees: TOYOTA JIDOSHA KABUSHIKI KAISHA, Toyota-shi (JP); AISIN AW CO., LTD., Anjo-shi (JP)

( * ) Notice: Subject to any disclaimer, the term of this patent is extended or adjusted under 35 U.S.C. 154(b) by 90 days.

(21) Appl. No.: 15/120,091

(22) PCT Filed: Feb. 17, 2015

(86) PCT No.: PCT/JP2015/000731
§ 371 (c)(1),
(2) Date: Aug. 18, 2016

(87) PCT Pub. No.: WO2015/125468
PCT Pub. Date: Aug. 27, 2015

(65) Prior Publication Data
US 2017/0074670 A1 Mar. 16, 2017

(30) Foreign Application Priority Data
Feb. 21, 2014 (JP) .................. 2014-031457

(51) Int. Cl.
*G01C 21/00* (2006.01)
*G01C 21/34* (2006.01)
(Continued)

(52) U.S. Cl.
CPC ......... *G01C 21/3453* (2013.01); *G01C 21/32* (2013.01); *G01C 21/3415* (2013.01);
(Continued)

(58) Field of Classification Search
None
See application file for complete search history.

(56) References Cited

U.S. PATENT DOCUMENTS

2002/0198694 A1\* 12/2002 Yang .................. G06F 17/5009
703/6
2004/0249568 A1\* 12/2004 Endo .................. G01C 21/3492
701/410
(Continued)

FOREIGN PATENT DOCUMENTS

EP 1 887 319 A1 2/2008
JP 11-37778 A 2/1999
(Continued)

OTHER PUBLICATIONS

International Search Report dated May 19, 2015 in PCT/JP2015/000731 Filed Feb. 17, 2015.

*Primary Examiner* — Thomas G Black
*Assistant Examiner* — Demetra R Smith-Stewart
(74) *Attorney, Agent, or Firm* — Oblon, McClelland, Maier & Neustadt, L.L.P.

(57) ABSTRACT

A travel time data processor extracts a link that is present in the neighborhood of a target link, as a reference link. The travel time data processor selects an identical time zone of the reference link that is identical with the time zone of the target link in which the number of sample data is less than
(Continued)

a reference number, and searches for another time zone having similar statistical data to that of the selected time zone. The travel time data processor adds the number of sample data in a time zone of the target link corresponding to the searched another time zone of the reference link to the number of sample data in the time zone of the target link that is equal to or less than the reference number, and generates statistical data from the summed-up sample data.

5 Claims, 11 Drawing Sheets

(51) Int. Cl.
    *G08G 1/00*           (2006.01)
    *G01C 21/32*         (2006.01)
    *G08G 1/01*           (2006.01)
    *G08G 1/0968*       (2006.01)

(52) U.S. Cl.
    CPC ..... *G01C 21/3446* (2013.01); *G01C 21/3492* (2013.01); *G08G 1/0112* (2013.01); *G08G 1/0129* (2013.01); *G08G 1/0141* (2013.01); *G08G 1/096827* (2013.01)

(56) References Cited

U.S. PATENT DOCUMENTS

| | | | | |
|---|---|---|---|---|
| 2008/0004789 | A1* | 1/2008 | Horvitz | G01C 21/3492 701/117 |
| 2008/0004802 | A1* | 1/2008 | Horvitz | G01C 21/3415 701/533 |
| 2009/0271105 | A1* | 10/2009 | Kindo | G01C 21/3407 701/439 |
| 2010/0328100 | A1 | 12/2010 | Fujiwara et al. | |
| 2011/0004397 | A1* | 1/2011 | Nagase | G08G 1/01 701/119 |
| 2015/0300835 | A1* | 10/2015 | Fowe | G01C 21/20 701/410 |
| 2016/0334236 | A1* | 11/2016 | Mason | G01C 21/3492 |
| 2017/0004146 | A1* | 1/2017 | Gavriil | G06F 17/30241 |

FOREIGN PATENT DOCUMENTS

| | | |
|---|---|---|
| JP | 2004-138477 A | 5/2004 |
| JP | 2008-241466 A | 10/2008 |
| JP | 2008-282162 A | 11/2008 |
| JP | 2011-203933 A | 10/2011 |

* cited by examiner

Fig.2

| TIME | LOCATION | USER ID | FUNCTION CODE |
|---|---|---|---|
| 130805110540 | (X11,Y11) | aaaa | 01 |
| 130805110541 | (X12,Y12) | aaaa | 01 |
| 130805110542 | (X13,Y13) | aaaa | 01 |
| ⋮ | ⋮ | ⋮ | ⋮ |
| 130805115501 | (X1n,Y1n) | aaaa | 01 |

(501) (502) (503) (504)

| USER ID | SERIAL NUMBER | LINK ID | TRAVEL TIME | APPROACH TIME | EXIT TIME | TRAVELING DIRECTION |
|---|---|---|---|---|---|---|
| aaaa | 1 | L0001 | 30 | 130522092530 | 130522092600 | 01 |
| aaaa | 2 | L0002 | 46 | 130522092601 | 130522092647 | 01 |
| aaaa | 3 | L0004 | 22 | 130522092648 | 130522092710 | 01 |
| aaaa | 4 | L0008 | 34 | 130522092711 | 130522092745 | 01 |
| aaaa | 5 | L0012 | 26 | 130522092746 | 130522092812 | 01 |
| ⋮ | ⋮ | ⋮ | ⋮ | ⋮ | ⋮ | ⋮ |

503  601  602  603  604  605  606

TRAVEL TIME DATA PROCESSING APPARATUS, TRAVEL TIME DATA PROCESSING METHOD AND PROGRAM

TECHNICAL FIELD

The present invention relates to a travel time data processing apparatus and a corresponding method of providing data regarding a travel time required for traveling a predetermined road section, based on probe information.

The present application claims priority from Japanese patent application P2014-31457 filed on Feb. 21, 2014, the content of which is hereby incorporated by reference into this application.

BACKGROUND ART

A proposed technique aggregates past probe data with regard to each day of the week and with regard to each time zone and generates statistical data of a travel time that is required from a place of departure to a destination, in order to calculate the travel time with high accuracy. One example of this technique is disclosed in a patent literature JP 2008-241466A. This technique stores traveling time data that relates a traveling time of a moving body such as an automobile with regard to each time zone to information identifying each road and attribute of the day such as the day of the week, in a storage. Every time the moving body travels on an actual road, a travel time required for traveling on the road is measured, and the measured traveling time and the stored traveling time are averaged for adjustment of the stored traveling time. A traveling time until the moving body reaches a point of destination is then predicted, based on the traveling time stored in relation to roads included in a route to the point of destination, the attribute of the day and the time zone.

SUMMARY

Technical Problem

The technique disclosed in the above patent literature may, however, have the insufficient prediction accuracy. One example is a road from which only an insufficient amount of probe data is obtained. Such a road has only insufficient probe data for sufficient statistics and accordingly has the low prediction accuracy. The reason for insufficient probe data may be, for example, the little traffic volume or the difficulty in uploading probe data due to the state of poor communication.

An object of the invention is to solve the problem of the technique of processing data regarding the travel time of a road using such probe data. Other needs include downsizing of the apparatus, easiness of the processing and improvement of the convenience.

Solution to Problem

In order to solve at least part the problems described above, the invention may be implemented by aspects described below.

(1) According to one aspect of the invention, there is provided a travel time data processing apparatus configured to process data regarding a travel time that is a time period required for traveling on a road. This travel time data processing apparatus may comprise a road network data storage configured to store road network data that includes link data representing roads; a probe information storage configured to store probe information obtained from each apparatus traveling on a road; a travel time data calculator configured to use the probe information and calculate data on the travel time with regard to each road corresponding to each piece of the link data; and a travel time data processor configured to select another piece of link data that satisfies a predetermined condition relative to one piece of link data and refer to travel time data of a road corresponding to the another piece of link data, so as to process data on the travel time of the one piece of link data.

Even when there is only an insufficient number of probe information for processing a travel time of one road, the configuration of this aspect enables the travel time of one road to be processed with high accuracy, based on information of another road having a certain relevance.

(2) In the travel time data processing apparatus of the above aspect, zoning information that defines a zoning of buildings may be provided to each piece of the link data, and the travel time data processor may refer to the zoning information and select the another piece of link data out of target pieces of link data having zoning information that is identical with or that has at least a certain relevance to the one piece of link data. The travel time data processing apparatus of this aspect selects the link data using the zoning information and thereby allows for selection of link data having the high relevance. The zoning information indicates divisions classified by the use or the intended, use of the land and are generally determined by an official organization such as an administrative agency with regard to each region. In Japan, "zoning districts" are known as the zone information. Regulating the intended use of the district and the height of buildings based on the zoning information prevents buildings of different intended uses or building of different heights from being mixed. This protects the landscape and the environment and facilitates the efficient activities.

(3) in the travel time data processing apparatus of the above aspect, road level information that defines a road level may be provided to each piece of the link data, and the travel time data processor may select the another piece of link data out of target pieces of link data having an identical road level with road level of the one piece of link data. The travel time data processing apparatus of this aspect enables link data to be selected appropriately.

(4) According to another aspect of the invention, there is provided a travel time data processing method. This method may comprise: causing a computer to obtain probe information from each apparatus traveling on a road; causing the computer to store the probe information into a probe information storage; causing the computer to use the probe information and calculate a travel time that is a time period required for traveling, with regard to each road corresponding to each piece of link data that is included in road network data stored in a road network data storage; and causing the computer to select another piece of link data that satisfies a predetermined condition relative to one piece of link data and refer to travel time data of a road corresponding to the another piece of link data, so as to process data on the travel time of the one piece of link data.

Even when there is only an insufficient number of probe information for processing a travel time of one road, the travel time data processing method of this aspect enables the travel time of one road to be processed with high accuracy, based on information of another road having a certain relevance.

The invention may be implemented by various aspects other than the travel time data processing apparatus and the corresponding method, for example, a method of manufacturing the travel time processing apparatus, a control method of the travel time data processing apparatus, a computer program that implements the control method and a program product in which program codes are recorded in a recording medium, and a non-transitory recording medium in which the computer program is recorded.

BRIEF DESCRIPTION OF DRAWINGS

FIG. 2 is a diagram illustrating the data structure of probe information sent from a mobile terminal;

DESCRIPTION OF EMBODIMENTS

The following describes concrete embodiments of the invention.

First Embodiment

Figure 1:
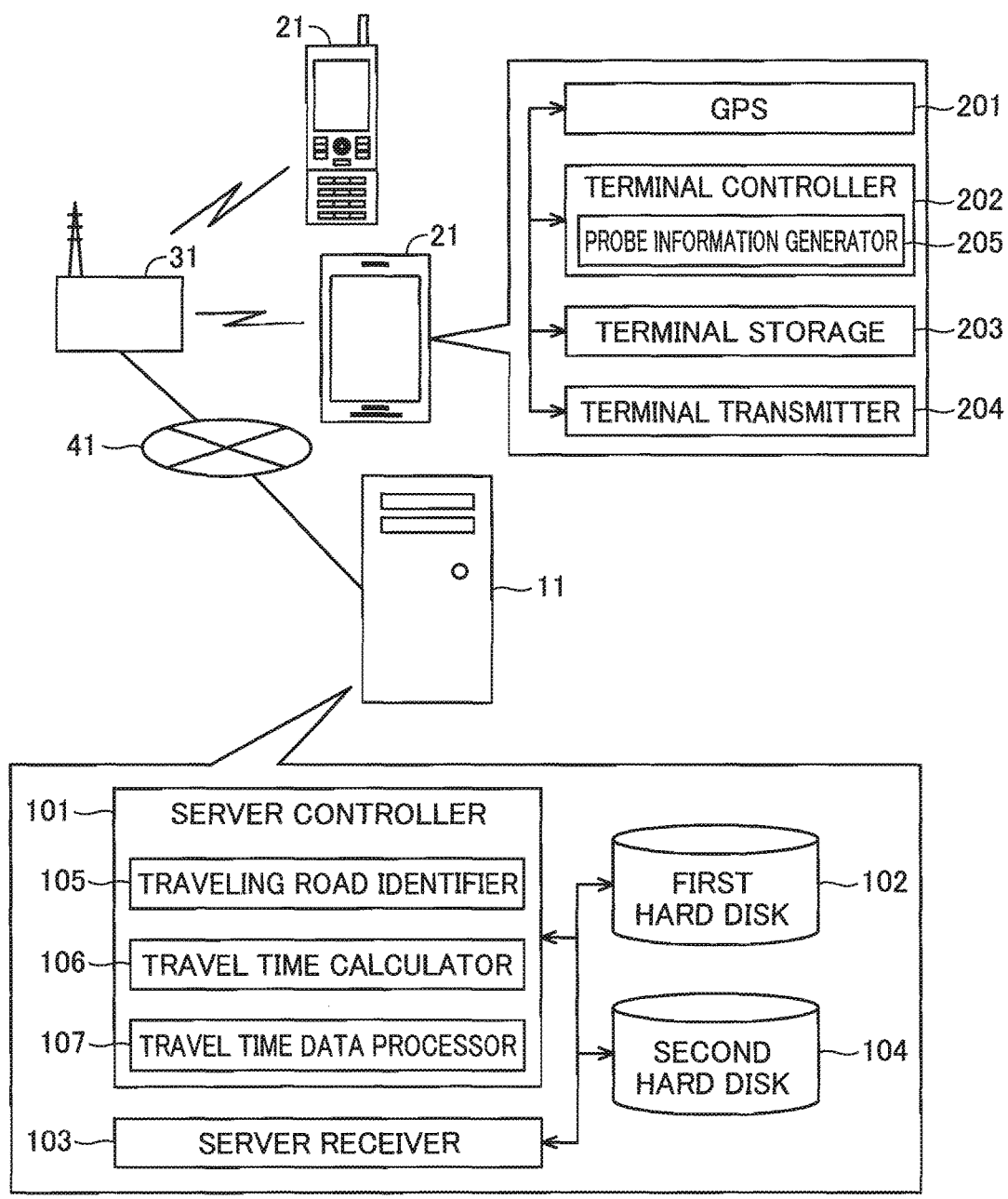
FIG. 1 is a configuration diagram illustrating a travel time data processing system according to the first embodiment.

As shown in FIG. 1, a travel time data processing system according to an embodiment is configured to include a server 11 serving as a travel time data processing apparatus and a plurality of mobile terminals 21 serving as information terminals. The server 11 and the plurality of mobile terminals 21 are interconnected to allow for bidirectional communication via a wireless base station 31 placed at a predetermined location and the Internet 41 as a public network.

The server 11 serves to calculate a travel time that is a time period required for running through a road, based on probe information sent from the mobile terminal 21. The travel time herein denotes a travel time with regard to each road between intersections. In other words, the travel time denotes a time period required for moving from one intersection to a nearest intersection. A navigation function mounted on the mobile terminal 21, a navigation apparatus mounted on the vehicle or the like calculates a total travel time from a place of departure to a destination using the travel time of each road calculated by this travel time data processing system and provides the user with the total travel time.

The server 11 includes a server controller 101, a first hard disk 102 as a road network data storage, a server receiver 103, and a second hard disk 104 as a probe information storage. The server controller 101 includes a traveling road identifier 105, a travel time calculator 106 and a travel time data processor 107. A non-illustrated CPU included in the server controller 101 executes software loaded on a memory to implement the traveling road identifier 105, the travel time calculator 106 and the travel time data processor 107 of the server controller 101. This software is stored in a non-illustrated recording medium such as a hard disk in the form of program codes and is loaded to and executed on a RAM or the like. The recording medium used is a storage device such as a hard disk according to this embodiment, but may be a flexible disk or an optical or magneto optical medium such as CD or DVD or may be a storage medium or recording medium on the network such as cloud.

The first hard disk 102 stores road network data. The road network data is configured to include link data representing roads and node data representing intersections. In other words, a road between intersections is defined by one link data.

Various pieces of attribute information are provided to the link data. For example, road level information, district type information, traffic regulation information, school zone information and link cost information are provided to the link data.

The road level information denotes information used to identify the type of a road, for example, highway, national road, prefectural road, city road.

The district type information denotes information showing what zoning information is provided to a road corresponding to the link data. The regulations called "zoning districts" are known in Japan as the zoning information. The zoning districts mean districts determined with a view to preventing buildings of different applications and intended uses are mixed in one district. The zoning districts are divided into three main districts, commercial district, residential district and industrial district. The commercial district is further divided into a commercial district and a neighborhood commercial district. The residential district is further divided into a category 1 residential district, a category 2 residential district, a category 1 medium-to-high-rise exclusive residential district, a category 2 medium-to-high-rise exclusive residential district, a category 1 low-rise exclusive residential district, a category 2 low-rise exclusive residential district and a quasi-residential area. The industrial district is further divided into a quasi-industrial district, an industrial district and an exclusive industrial district.

The traffic regulation information denotes information provided when a road corresponding to the link data is subject to, for example, one-way traffic, speed limit or prohibition of traffic in a certain time zone.

The school zone information denotes information provided when a road corresponding to the link data is included in a school zone. When the road is included in the school zone, information regarding time zones for going school and going home is also included in the school zone information.

The link cost information is information mainly used for a route search by the navigation apparatus and denotes information quantifying the traveling performance in the link. Only one piece of the link cost information may be provided to one link, but multiple different pieces of the link cost information may be provided to one link corresponding to different priorities in navigation, for example, time priority, distance priority or traveling performance priority. According to this embodiment, attribute information such as traffic regulation information and node cost information is also provided to node data.

The server receiver 103 receives probe information sent from the mobile terminal 21. The details of the probe information will be described later. The second hard disk 104 stores the received probe information. The traveling road identifier 105 applies large amounts of probe information sent from a plurality of the mobile terminals 21 to the road network data and identifies what time and on which road each piece of the probe information is obtained. A concrete process of such identification will be described later.

The travel time calculator 106 uses the probe information to calculate a travel time with regard to each road corresponding to the link data and generates sample data including information regarding the travel time. The travel time calculator 106 also serves to generate statistical data regarding the travel time, as data on travel time with regard to each predetermined time zone, based on the sample data. The details of a method of calculating the travel time and the statistical data will be described later.

The travel time data processor 107 processes the statistical data generated by the travel time calculator 106 by predetermined processing. The details of the processing will be described later. The processing processes the statistical data generated based on the probe data to provide a sufficient number of data as the statistical data.

The mobile terminal 21 may be configured by a cell phone or a navigation apparatus including a communication function mounted on the vehicle. The mobile terminal 21 includes a GPS (global positioning system) 201 as a location identifier, a terminal controller 202, a terminal storage 203 and a terminal transmitter 204. The terminal controller 202 includes a probe information generator 205. A non-illustrated CPU included in the terminal controller 202 executes software loaded on a memory to implement the probe information generator 205.

The GPS 201 simultaneously receives GPS signals sent from a plurality of GPS satellites and obtains its own location information including, for example, latitude and longitude information of its own location and time information, from the received GPS signals. The probe information generator 205 generates probe information, based on the own location information obtained by the GPS 201. As shown in FIG. 2, the probe information includes time information 501, location information 502, a user ID 503 and a function code 504. The time information 501 includes information on the year, month, date, hour, minute and second and denotes information regarding the time when the probe information is obtained.

The location information 502 is expressed by a coordinate point of latitude and longitude and denotes information indicating the location where the user travels. This coordinate point is specified by the latitude and the longitude after route matching of the own location information obtained by the GPS 201 to a search route during route guidance. Accordingly the coordinate point is information on the latitude and longitude on the road. The user ID 503 denotes information uniquely assigned to each of the mobile terminals 21 by which the probe information is obtained. The function code 504 denotes information showing in what navigation mode the probe information is obtained. The navigation mode is, for example, vehicle navigation or pedestrian navigation. For example, vehicle navigation is expressed as 01, pedestrian navigation is expressed as 02, and bicycle navigation is expressed as 03.

The terminal storage 203 stores the generated probe information.

The terminal transmitter 204 sends the probe information generated by the probe information generator 205 to the server 11 via the wireless base station 31 and the Internet 41. The probe information is accordingly uploaded to the server. According to this embodiment, only the probe information generated during route guidance by the navigation function is sent to the server 11. The location information is used on the premise of route matching to a search route, so that only target roads and part of non-target roads used in route search are subject of transmission. The target road means a road for which the road network data is present, and the non-target road means a road for which the road network data is not present. An example of the non-target road is a road in the vicinity of a starting point (place of departure) or in the vicinity of an end point (destination) in route search. The coordinate point that fails in normal route matching as the result of determination that the coordinate point is deviated from the route is excluded from the subject of transmission.

The probe information is generated at predetermined intervals by the probe information generator 205. This interval of generation is determined by taking into account the traveling speed. For example, during vehicle route guidance, the traveling speed is high speed, so that the probe information is generated at intervals of 1 second. During pedestrian route guidance, the traveling speed is low speed, so that the probe information is generated at intervals of 5 seconds. This interval of generation may be appropriately changed by the user using a navigation settings function.

The transmission timing of the probe information to the server 11 is generally the interval of 1 second. When the probe information is generated at the intervals of 1 second, the terminal transmitter 204 sequentially sends the generated probe information to the server 11.

The following describes travel time data processing performed by the travel time data processing system configured as described above. This processing is performed at a predetermined timing of a day. At the time when this processing is started, large amounts of probe information have been sent from the plurality of mobile terminals 21 at intervals of, for example, every 1 second as described above after a previous cycle of this process and have been stored in the second hard disk 104.

<Probe Information Conversion Process>

The traveling road identifier 105 first converts the probe information sent from the plurality of mobile terminals 21 into sample data from which the travel time with regard to each road is calculable. This conversion process is triggered when the probe information sent from the mobile terminal 21 is accumulated in the second hard disk 104 such as to satisfy a predetermined condition. The predetermined condition may be, for example, accumulation of the probe information for a period of one week or one month.

Figure 3:
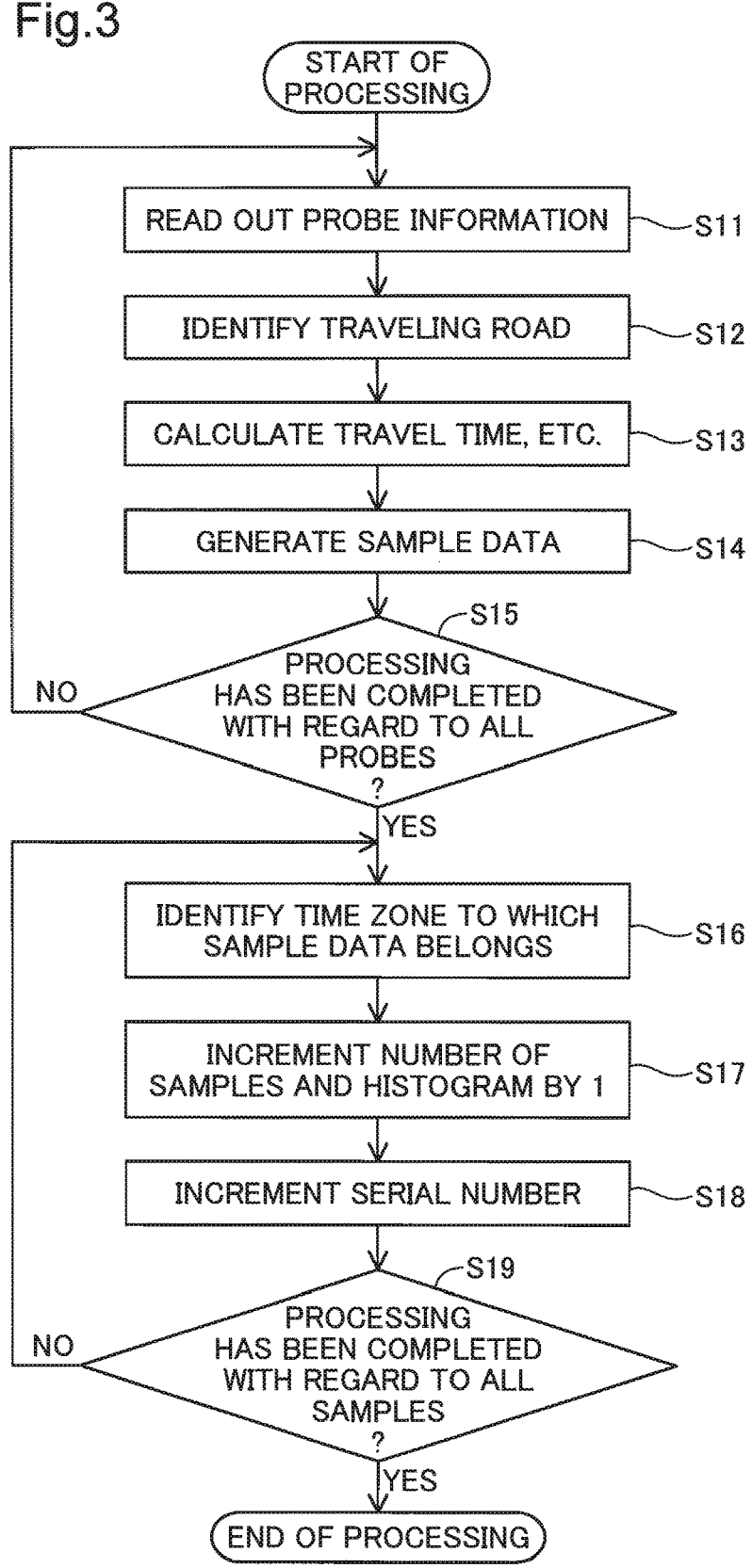
FIG. 3 is a flowchart showing a probe information conversion process.

As shown in FIG. 3, the server controller 101 first collectively reads out probe information having an identical user ID 503 and consecutive pieces of time information 501 from the second hard disk 104 (step S11). The server controller 101 refers to the function codes 504 of the probe information and selectively reads only the probe information by the vehicle navigation. This aims to calculate the travel time of the vehicle on the road.

The server controller 101 subsequently reads out the road network data from the first hard disk 102 and identifies on which link (road) the probe information is obtained (step S12). In the illustrated example of FIG. 4, the server controller 101 performs matching of probes (P1 to P12) sent from a certain mobile terminal 21 with links and determines that the probes P1 to P6 are located on the link L1 and that the probes P7 to P12 are located on the link L2.

The traveling road identifier 105 then divides the collectively read-out series of probe information into probe information with regard to the respective links and temporarily stores each division of probe information with regard to each link in relation to the link ID of the link into the second hard disk 104.

The server controller 101 subsequently calculates a travel time 603, an approach time 604, an exit time 605 and a traveling direction 606, based on the link data and the probe information (step S13).

The travel time 603 denotes a time period required for traveling from one end to the other end of a road corresponding to a link. In the case of the link L1 shown in FIG. 4, the travel time 603 is determined by calculating a difference between the time of the probe P1 and the time of the probe P6 that are the probes at both the ends located on the link L1.

The approach time 604 denotes a time of approach to the road corresponding to the link. In the illustrated example of FIG. 4, the time of acquisition of the probe P1 that is obtained at the earliest time among the probes mapped to the link L1 is specified as the approach time to the link L1.

The exit time 605 denotes a time of exit from the road corresponding to the link. In the illustrated example of FIG. 4, the time of acquisition of the probe P6 that is obtained at the latest time among the probes mapped to the link L1 is specified as the exit time from the link L1. The traveling direction 606 indicates from which direction to which direction the probe proceeds on the link. The traveling direction 606 may be specified as information "01" for the up direction of the link and as information "02" for the down direction of the link.

Figures 4, 5:
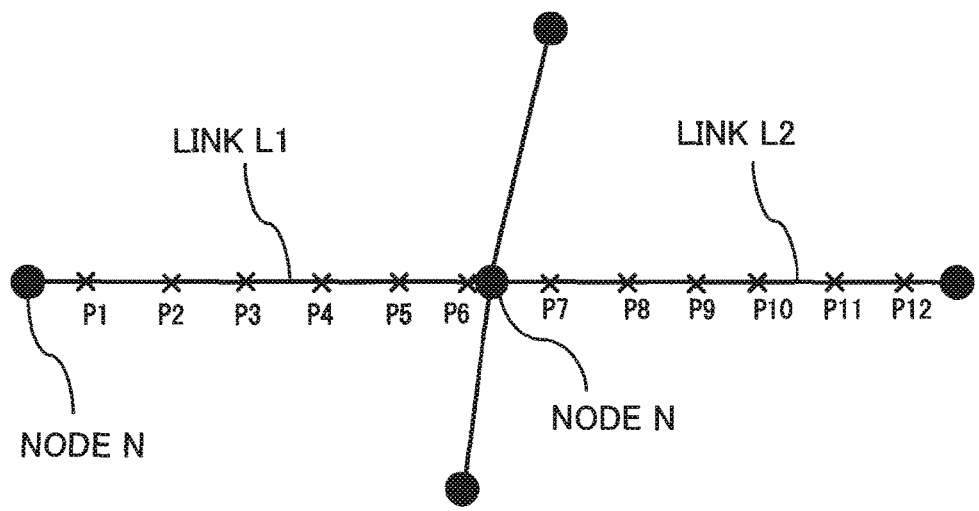
FIG. 4 is a diagram illustrating the probe information conversion process.
FIG. 5 is a diagram illustrating the data structure of sample data as converted probe information.

The server controller 101 then generates sample data including these pieces of information as shown in FIG. 5 (step S14). This series of processing is performed with regard to all the pieces of probe information sent from the mobile terminal 21 (step S15). A serial number 601 shown in FIG. 5 denotes a number indicating the sequence of generation of sample data from the probe information sent from one mobile terminal 21.

<Process of Generating Statistical Data>

Figure 6:
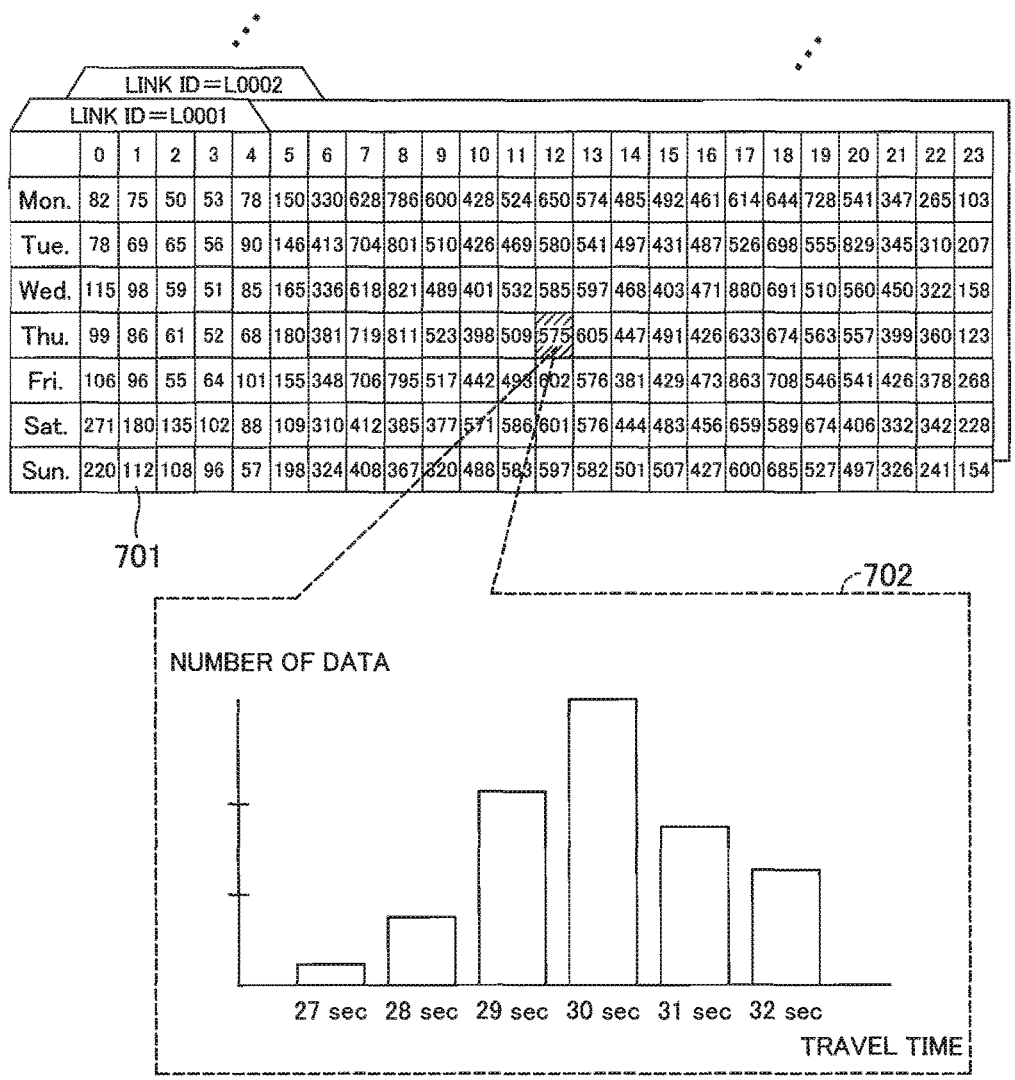
FIG. 6 is a diagram illustrating statistical data.

When it is determined that the processing has been completed with regard to all the pieces of probe information (step S15: "YES"), the server controller 101 performs a process of updating statistical data on the travel time from the generated sample data, with regard to each road corresponding to one link and with regard to each predetermined time zone as described below. As shown in FIG. 6, this process updates statistical data including traveling vehicle number information 701 that shows how many vehicles have traveled on the road in each time zone and a histogram 702 with regard to each time zone that counts the traveling vehicle number information 701 with regard to each travel time. The statistical data shown in FIG. 6 is generated from the probe information for a period of past one year and is updated by the following process, based on the sample data generated on the basis of new probe information as described above.

The server controller 101 extracts sample data having the serial number 601 of 1, refers to the approach time 604 of the extracted sample data and identifies the day of the week and the time zone which the extracted sample data belongs to (step S16). The server controller 101 subsequently increments the number of samples in the time zone to which the extracted sample data belongs by value 1 and additionally increments the histogram of the time period required for passing through the road corresponding to the link data by value 1 (step S17). The server controller 101 then increments the serial number by value 1 (step S18) and determines whether updating the statistical data has been completed based on all the sample data (step S19). When updating has not yet been completed, the above series of processing (step S16 to S19) is repeated until the processing has been completed with regard to all the sample data. Completion of the processing based on all the sample data means that the statistical data has been updated to the latest data. The generated statistical data is stored in the first hard disk 102, in relation to the link data stored in the first hard disk 102.

<Statistical Data Estimation Process>

Figure 7:
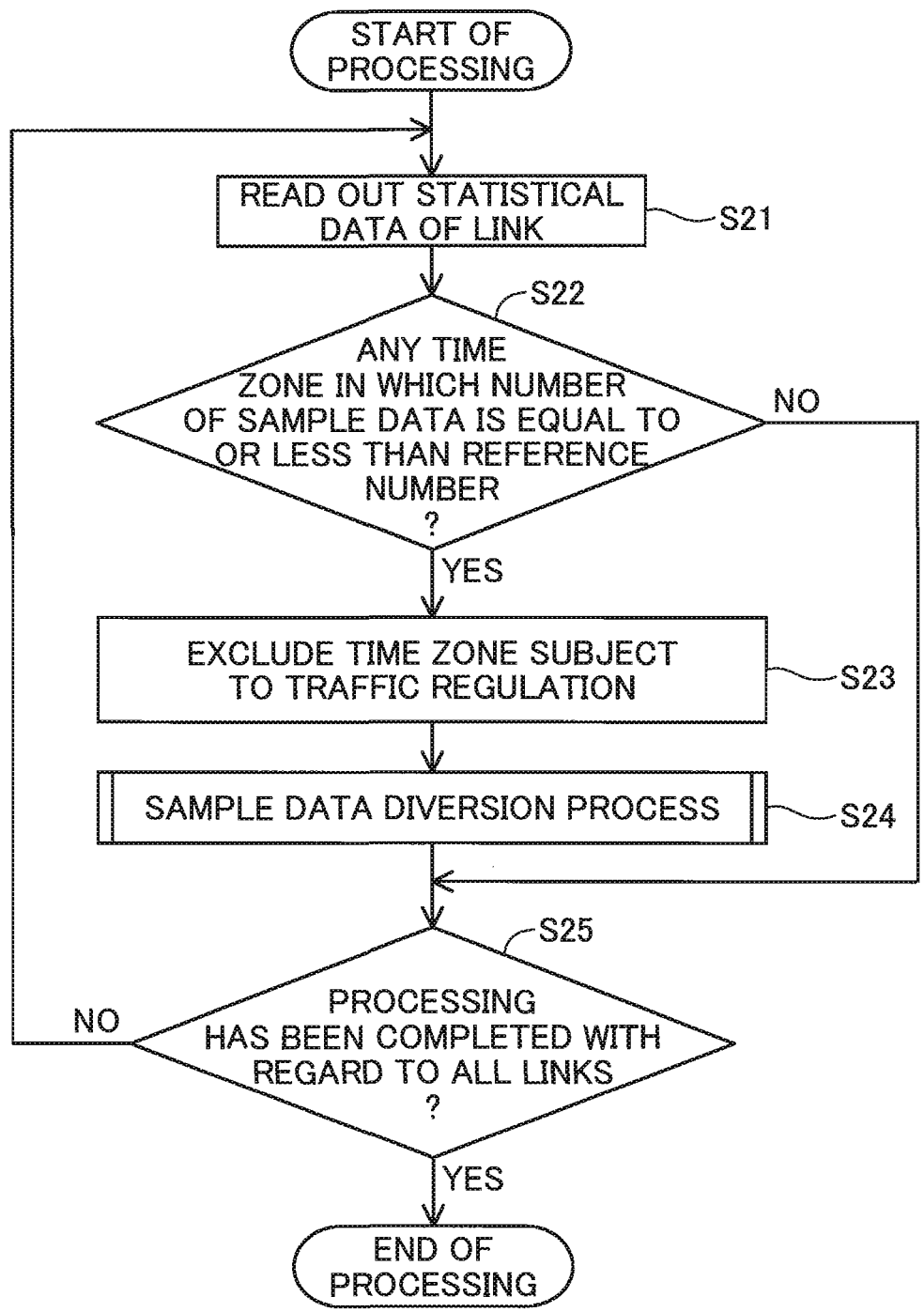
FIG. 7 is a flowchart showing a sample data diversion process.

After the statistical data on the travel time is generated with regard to each of all the roads, this statistical data is processed. This processing is shown in FIG. 7. As illustrated, when updating the statistical data (shown in FIG. 6) generated from the probe information for the period of one year has been completed, the server controller 101 first reads out entire statistical data on a target link that is one link among the link data for which the statistical data has been updated, from the first hard disk 102 (step S21) and determines whether there is any time zone in which the number of sample data is equal to or less than a reference number (for example, 300 in this embodiment) among a total of 168 patterns from Monday to Sunday and 0 o'clock to 24 o'clock (step S22).

When there is any time zone in which the number of sample data is equal to or less than the reference number, the server controller 101 determines whether the time zone on the target link is subject to a traffic regulation and, when the time zone is subject to the traffic regulation, excludes the time zone (step S23). The server controller 101 determines whether the time zone is subject to the traffic regulation by referring to the traffic regulation information provided as the attribute information to the target link data. Such exclusion is on the assumption that the road where and the time zone when the traffic regulation is provided have little (or no) traffic of vehicles.

After excluding the time zone in which the traffic regulation is provided, the server controller 101 performs a sample data diversion process with regard to an extracted time zone (step S24). When there is no time zone in which the number of sample data is equal to or less than the reference number or when the traffic regulation is provided in all the time zones in which the number of sample data is equal to or less than the reference number, the server controller 101 proceeds to the subsequent processing without performing the sample data diversion process with regard to the target link. The sample data diversion process will be described later.

The travel time data processor 107 then determines whether the processing has been completed with regard to all the links (step S25). When it is determined that the processing has not yet been completed, the server controller 101 reads out another link as a new target link and repeats the above series of processing. When it is determined that the processing has been completed, the server controller 101 terminates the processing of the statistical data. In the above series of processing, the process of steps S11 and S12 in FIG. 5 corresponds to the functions of the traveling road identifier 105. The process of steps S13, S14 and S18 in FIG. 5 corresponds to the functions of the travel time calculator 106. The process of FIG. 7 corresponds to the functions of the travel time data processor 107.

The server controller 101 may exclude a target time zone that satisfies at least one of the following conditions from the target of the sample data diversion process in the exclusion process of step S23:

In the case where the target time zone is in a midnight time zone: The midnight time zone, for example, 0 o'clock to 5 o'clock, generally has little traffic and almost constant travel time with less variation; and In the case where a predetermined percentage of the whole data is included in the range of an average travel time±a standard deviation of the target time zone which are calculated by referring to the histogram of the target time zone: For example, when data of not less than 80% is included in this range, it is determinable that the travel time has high reliability.

<Sample Data Diversion Process>

Figure 8:
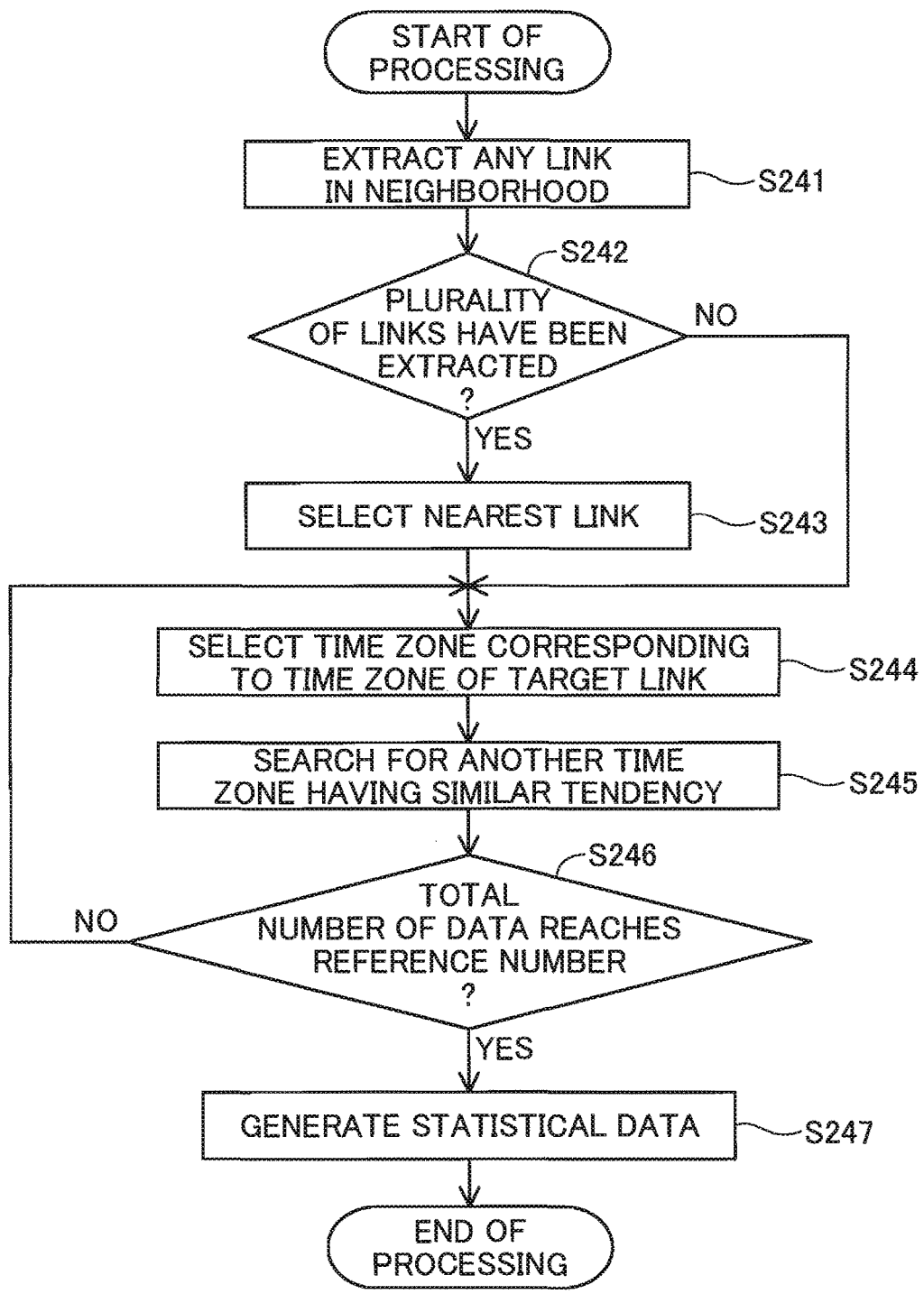
FIG. 8 is a flowchart showing a sample data diversion process.
Figure 9:
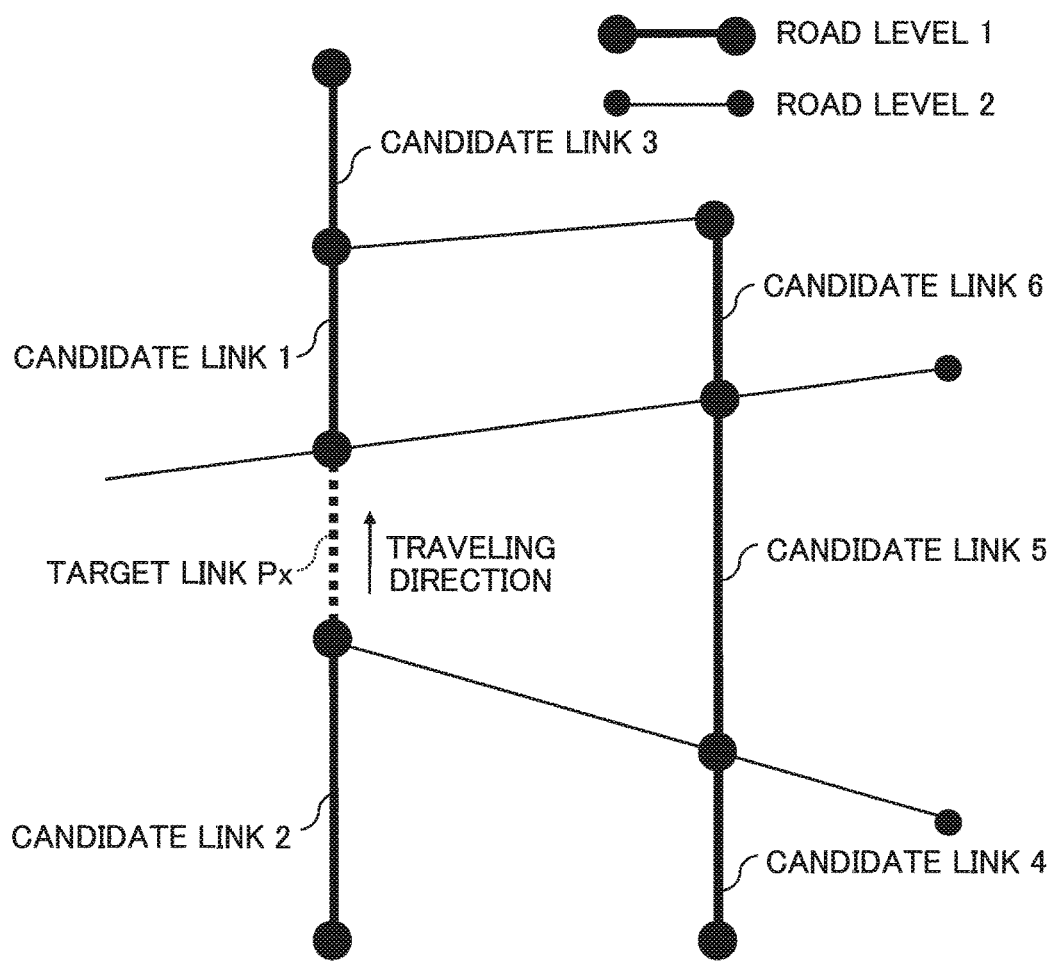
FIG. 9 is a diagram illustrating selection of a reference link in the sample data diversion process.

As shown in FIG. 8, on the start of the processing, the server controller 101 refers to the road network data and extracts any link that is present in the neighborhood of the target link and has the same road level as that of the target link (step S241). The neighborhood of the target link may be, for example, within the direct distance of 2 km from the target link. This aims to select a road that is likely to have the similar tendency of traffic. An example of extraction of links is illustrated in FIG. 9. A target link Px corresponds to a road having the road level 1. The links that are present within the distance of 2 km from the target link Px and have the same road level as that of the target link Px include candidate link 1 and candidate link 2 continuing from the target link Px, candidate link 3 continuing from the candidate link 1, and candidate links 4 to 6 that are present across roads having the road level 2.

The server controller 101 subsequently determines whether a plurality of links have been extracted (step S242). When a plurality of links have been extracted, the travel time data processor 107 selects a link nearest to the target link among the plurality of links, as a reference link (step S243). More specifically, the server controller 101 performs a route search from an end point of the target link specified as the starting point to respective end points of the plurality of extracted links specified as terminal points without allowing a U-turn, and selects a link that takes the shortest time from the target link as the reference link. The known Dijkstra's algorithm may be employed for the route search process.

In the illustrated example of FIG. 9, the candidate link 2, the candidate link 4 and the candidate link 5 are excluded from the target of processing in terms of the traveling direction of the route search, and the candidate link 1 is determined as the nearest link and is thereby selected as the reference link. If the road corresponding to the candidate link 1 has the road level 2, either the candidate link 3 or the candidate link 6 is determined as the nearest link and is selected as the reference link. When there is only one extracted link, the travel time data processor 107 selects the extracted link as the reference link.

The travel time data processor 107 subsequently selects an identical time zone of the statistical data of the reference link that is identical with the time zone of the statistical data of the target link in which the number of sample data is less than the reference number (step S244). The server controller 101 then searches the statistical data of the reference link for another time zone that has similar statistical data to the statistical data of the selected time zone (step S245). More specifically, the server controller 101 determines the correlations of the statistical data (histograms) of other time zones to the statistical data (histogram) of the selected time zone and selects the time zone having the highest correlation value. Another applicable method may search for another time zone that has the same average travel time as that of the selected time zone. A plurality of (for example, five) time zones may be selected in the descending order of correlation value.

Figure 10:
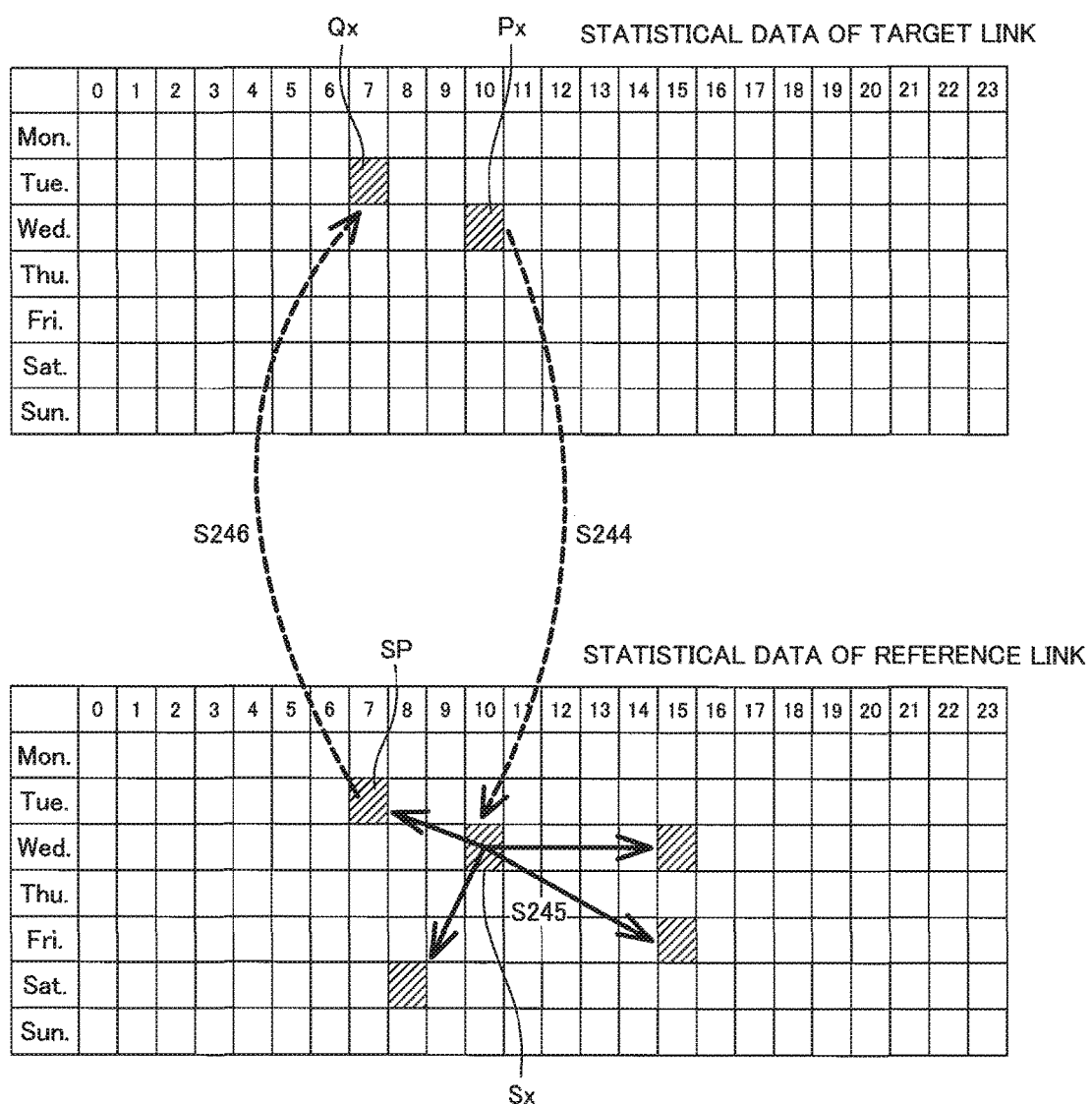
FIG. 10 is a diagram illustrating a procedure of summing up statistical data in the sample data diversion process.

This process is described with reference to FIG. 10. The upper drawing of FIG. 10 illustrates statistical data of the target link, and the lower drawing illustrates statistical data of the reference link. In the statistical data of the target link, the number of sample data in a one-hour time zone from 10 o'clock on Wednesday (shown as time zone Px) is less than 300. The processing of step S244 selects an identical time zone Sx that is identical with this time zone Px from the statistical data of the reference link. The subsequent processing of step S245 searches the statistical data of the reference link for another time zone similar to the time zone Sx. As the result of the search, four time zones having the high correlations (one hour from 7 o'clock on Tuesday, one hour from 15 o'clock on Wednesday, one hour from 15 o'clock on Friday and one hour from 8 o'clock on Saturday) are selected and are shown by hatching in FIG. 10. A one-hour time zone from 7 o'clock on Tuesday is selected as the time zone having the highest correlation to the statistical data of the selected time zone Sp.

The travel time data processor 107 subsequently adds the number of sample data in a time zone Qx of the target link corresponding to the selected time zone SP of the reference link to the number of sample data in the time zone Px that is equal to or less than the reference number and determines whether the total number of sample data provided exceeds the reference number (step S246). When the number of sample data provided does not exceed the reference number, the travel time data processor 107 repeats the above series of processing to search for another time zone with regard to another reference link. When the number of sample data provided exceeds the reference number, on the other hand, the travel time data processor 107 newly generates statistical data by adding the sample data summed at step S246 (step S247).

The travel time data processor 107 then replaces statistical data for reference stored in the first hard disk 102 with the generated statistical data. The statistical data for reference denotes statistical data to be referred to in a process such as route guidance, in contrast to statistical data (shown in FIG. 6) generated from only the sample data based on the actual probe information. Separating the statistical data for reference generated by the sample data diversion process from the statistical data generated based on only the probe information causes data of a time zone that does not require diversion of sample data not to include data of the other time zones when sufficient amounts of probe information are accumulated.

As described above, this embodiment accumulates the probe information sent from the information terminals 21, processes the accumulated probe information at a predetermined timing and updates the statistical data with regard to each link to generate statistical data for reference. When there is a certain time zone in which the number of samples is less than 300 out of the statistical data of the specified dates of the week and the specified time zones (168 patterns in the first embodiment) based on the probe information for the period of past one year, the statistical data of another time zone that is determined to have the high correlation to the statistical data of the certain time zone is used to provide a sufficient number of the statistical data with regard to the certain time zone. This enables a route guidance apparatus or the like to calculate a travel time from a predetermined place of departure to a predetermined destination during route guidance, based on the sufficient number of statistical data. When the statistical data for reference used as the basis for calculation of the travel time includes unique data affected by the traffic regulation or the like, diversion of data of the other time zones is not performed. This prevents the unique data from being averaged by diversion of data of the other time zones and thereby prevents reduction of the reliability of the statistical data. Pieces of probe information sent from the information terminals 21 are accumulated almost in real time and are collectively reflected on the statistical data at a predetermined timing. The statistical data that is close to the latest and has high reliability can thus be used for calculation of the travel time.

Second Embodiment

Configuration of the Second Embodiment

In the first embodiment, the traveling road identifier 105 provided in the server 11 identifies the link corresponding to the probe information sent from the mobile terminal 21. According to the second embodiment, this processing is performed on the mobile terminal 21-side. The process of generating sample data and statistical data of this embodiment is similar to the process of the first embodiment. The like components of this embodiment to those of the first embodiment are expressed by like numerals and are not specifically described or are only briefly described.

Figure 11:
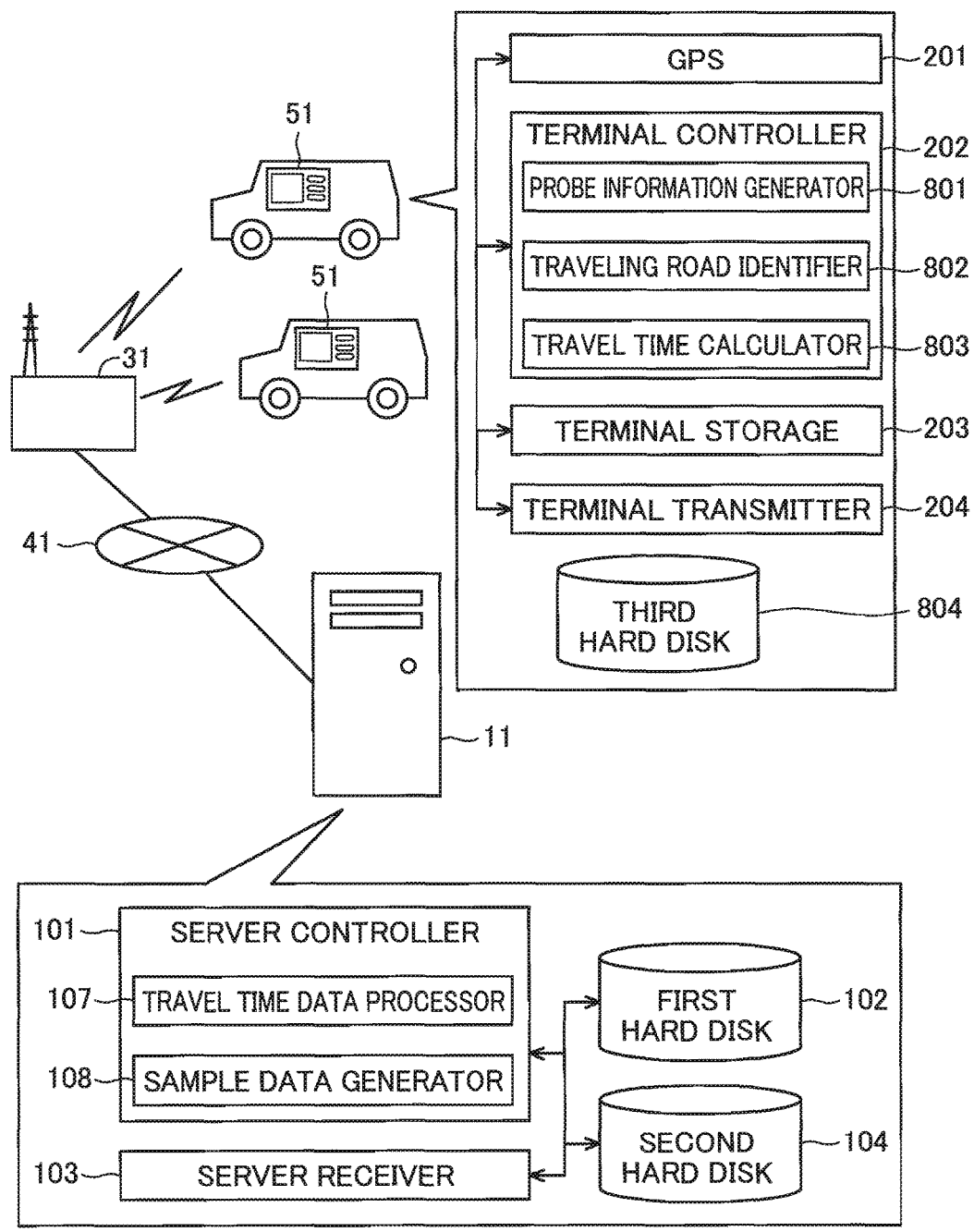
FIG. 11 is a configuration diagram illustrating a travel time data processing system according to the second embodiment.

As shown in FIG. 11, a travel time data processing system of this embodiment is configured to include a server 11 serving as a travel time data processing apparatus and a plurality of navigation apparatuses 51 as vehicle-mounted apparatuses. The server 11 includes a server controller 101, a first hard disk 102, a server receiver 103 and a second hard disk 104 as a probe information storage. The server controller 101 includes a travel time data processor 107 and a sample data generator 108. A non-illustrated CPU included in the server controller 101 executes software loaded on a memory to implement the travel time data processor 107 and the sample data generator 108 of the server controller 101.

The navigation apparatus 51 is mounted on the vehicle and includes a GPS 201, a terminal controller 202, a terminal storage 203, a terminal transmitter 204 and a third hard disk 804. The third hard disk 804 stores road network data that is similar to that stored in the first hard disk 102. The terminal controller 202 includes a probe information generator 205, a traveling road identifier 105 and a travel time calculator 106. A non-illustrated CPU included in the terminal controller 202 executes software loaded on a memory to implement the probe information generator 205, the traveling road identifier 105 and the travel time calculator 106 of the terminal controller 202.

As described above, this embodiment differs from the first embodiment by that the traveling road identifier 105, the travel time calculator 106 and the third hard disk 804 are provided in the navigation apparatus 51 and that the sample data generator 108 is provided in the server 11.

<Probe Information Conversion Process>

The traveling road identifier 105 of the navigation apparatus 51 converts probe information generated by the probe information generator 205 into sample data from which a travel time of each road is calculable.

Figure 12:
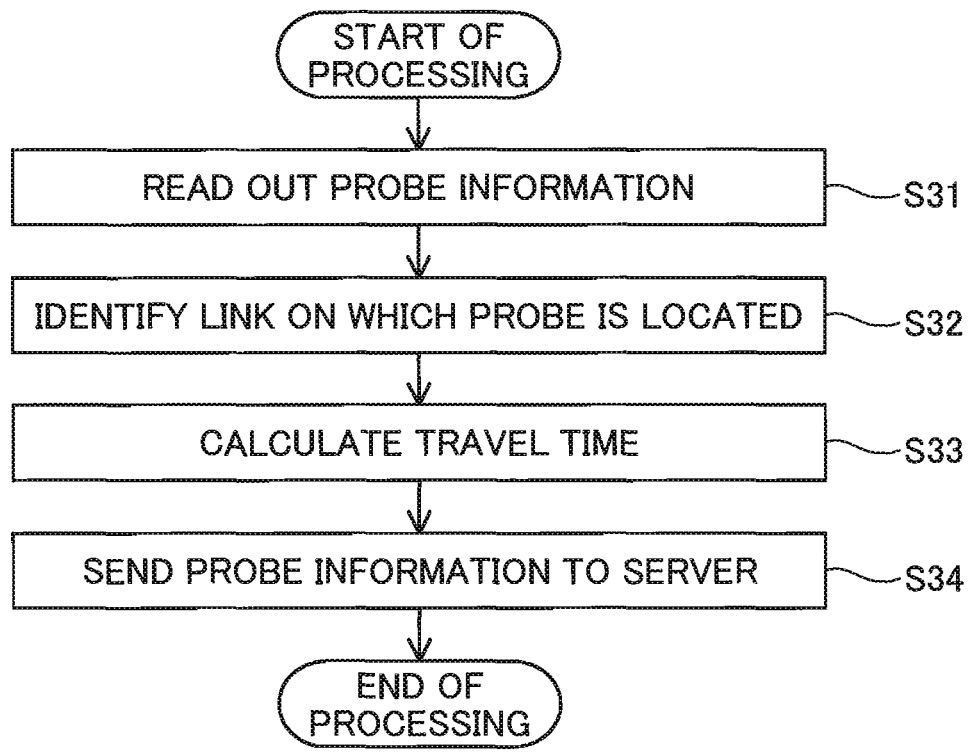
FIG. 12 is a flowchart showing a probe information conversion process.

As shown in FIG. 12, the traveling road identifier 105 first collectively reads out probe information having consecutive pieces of time information 501 from the terminal storage 203 (step S31). The probe information has the same data structure as that shown in FIG. 2 and includes time information 501, location information 502, a user ID 503 and a function code 504. The traveling road identifier 105 subsequently reads out the road network data from the third hard disk. 804 and identifies on which link (road) the probe information is located (step S32).

The travel time calculator 106 subsequently calculates a travel time 603, an approach time 604, an exit time 605 and a traveling direction 606, based on the link data and the probe information (step S33). As a result, the travel time calculator 106 generates data similar to that shown in FIG. 5. The converted probe information is sent to the server 11 via the terminal transmitter 204 (step S34). The frequency of transmission may be every time the converted probe information is generated or may be collective transmission after accumulation of a predetermined number of probe information.

The sample data generator 108 of the server 11 generates statistical data on the travel time of a road (link) with regard to each predetermined time zone, based on the probe information received from the navigation apparatuses 51. The statistical data generated is similar to that described in the first embodiment.

Advantageous Effects of Second Embodiment

When a certain road specified as a target of calculation of a travel time has a small number of sample data and accordingly has low reliability of calculation, the second embodiment described above extracts another road expected to have a certain relevance to the traffic volume of the certain road and estimates which time zone of sample data is to be added based on the tendency of the traffic volume of another road, like the first embodiment. This configuration refers to the sample data of the time zone that has the similar tendency of the traffic volume, so as to enhance the reliability of the travel time of the certain road. Additionally, in the second embodiment, the travel time data is calculated on the vehicle side. This reduces the load of the server 11. The server 11 processes the travel time data using data of another link and accordingly has high processing load. The configuration of generating statistical data on the vehicle side has significant effect of reducing the processing load of the server 11.

<Modifications>

In the above embodiments, the following method may be employed to select the reference link in the sample data diversion process.

(1) Method Using Zoning Information:

The travel time data processor 107 may refer to the zoning information provided as attribute information to the link data and select a link corresponding to a road that is included in a predetermined distance from a road corresponding to a target link and belongs to the same zoning district as that of the target link, as a reference link. This is on the assumption that a road belonging to the same zoning district is expected to have similar tendency of the traffic volume.

(2) Method Using School Zone:

The travel time data processor 107 may refer to the school zone information provided as attribute information to the link data and, when a target link corresponds to a road included in a school zone, select a link that is included in a predetermined distance from the road corresponding to the target link and has school zone information as the attribute information, as a reference link. The school zone is an area set in the range of about 500 m in radius from, for example, an elementary school or kindergarten. A traffic regulation, for example, prohibition of traffic, one-way traffic, stop, speed limit may be provided in certain time zones for going school and going home. This provides a characteristic traffic condition different from those of other roads. Additionally, a reference link may be selected by using one condition or a combination of two or more conditions selected from a plurality of conditions including the road level, the zoning information and the school zone.

(3) Method Using Entrance/Exit Information to and from a Facility (POI):

The travel time data processor 107 may refer to facility information regarding a facility and select a reference link. This is on the assumption that the facility information is stored in advance in the first hard disk 102. The facility information includes various pieces of information, such as the location information of the facility a link corresponding to a road connecting with an entrance/exit of the facility (access road), the type of the facility (for example, commercial facility, restaurant, amusement facility or public facility), and the opening hours of the facility.

The data processor 107 may refer to these pieces of information stored in the first hard disk 102 and select a reference link. More specifically, the travel time data processor 107 may select a link that satisfies the following conditions (a) to (d) as a reference link, when the target link is connected with an entrance/exit of a predetermined facility:

(a) a link corresponding to a road that is connected with an entrance/exit of the same type of a facility as that of the facility having the entrance/exit connected with the target link;

(b) a link that is included in a predetermined distance (for example, 1 kin) from the target link;

(c) a link that has the same road level as that of the target link; and (d) a link that has the number of samples of not less than a predetermined number, for example, a link having samples of not less than 300 that is equal to the reference number in the statistical data estimation process.

The road in the neighborhood of the same type of facility is estimated to have a certain relevance of the traffic condition and have similar tendency of the traffic volume. When the target link is connected with the entrance/exit of the predetermined facility, the travel time data processor 107 may select a link that necessarily satisfies the condition (a) and additionally satisfies at least one of the conditions (b) to (d), as a reference link. Another condition, for example, a condition whether the facility is open in a target time zone, may be used additionally in combination.

In the embodiments and modifications described above, when no reference link is extracted in the sample data diversion process, the travel time data processor 107 may extend the target range for extraction of a reference link and perform a process of extracting the reference link again. For example, when the "zoning district" as one piece of zoning information is used for extraction of a reference link, the first target range for extraction may be a link belonging to the same zoning district out of twelve different types of zoning districts, such as the commercial district, the neighborhood commercial district, and the category 1 residential district. When no reference link is extracted in this target range, the target range for extraction may be extended to the main district, "commercial district", "residential district" or "industrial district".

The invention may be implemented by any of various other aspects. For example, the above embodiment processes the travel time data with regard to only the time zone having the number of samples N that is equal to or less than a reference value (for example, 300) out of the 168 patterns classified by the day of the week and the time zone. The number of samples as the criterion is not limited to 300 but may be, for example, 500 or 1000. The reference number may be varied according to the road type and the road level. Data of a subsequent link to the target link may be used to increase the number of data with regard to each time zone.

The timing of transmission of the probe information to the server 11 may be a transmission timing in an energy-saving mode by taking into account the processing load and the remaining battery level of the mobile terminal 21. In this case, the terminal transmitter 204 may collectively send multiple pieces of probe information to the server 11 at long time intervals of, for example, 3 seconds, 10 seconds or 30 seconds. When a navigation apparatus detects a stop of the vehicle at the position of a red light or at the position of a stop line during route guidance, the terminal transmitter 204 may stop transmission of probe information to the server 11, in order to prevent the same pieces of probe information at the same position from being sent during the vehicle stop.

REFERENCE SIGNS LIST 11 server
21 mobile terminal
101 server controller
102 first hard disk
103 server receiver
104 second hard disk
106 travel time calculator
107 travel time data processor
202 terminal controller

The invention claimed is:

1. A travel time data processing apparatus configured to process data regarding a travel time that is a time period required for traveling on a road, the travel time data processing apparatus comprising:
  a road network data storage configured to store road network data that includes link data representing roads;
  a probe information storage configured to store probe information obtained from each apparatus traveling on a road;
  a travel time data calculator configured to use the probe information and calculate data on the travel time with regard to each road corresponding to each piece of the link data; and
  a travel time data processor configured to:
  when a time zone of statistical data of one piece link data has a number of probe information that is insufficient for calculating a travel time of the road represented by the one piece of link data:
    select another piece of link data that satisfies a predetermined condition relative to the one piece of link data,
    select a time zone of statistical data of the other piece of link data that is identical to the time zone of statistical data of the one piece of link data,
    search statistical data of the other piece of link data for another time zone of statistical data that has similar statistical data to statistical data of the selected time zone of statistical data of the other piece of link data,
    select the other time zone of statistical data of the other piece of link data that has the similar statistical data, and
    add a number of probe information in the selected other time zone of statistical data of the other piece of link data to the number of probe information in the time zone of statistical data of the one piece of link data that has the number of probe information that is insufficient.

2. The travel time data processing apparatus according to claim 1, wherein
each piece of the link data includes zoning information that defines a zoning of buildings, and
the travel time data processor refers to the zoning information and selects the other piece of link data out of target pieces of link data having zoning information that is identical with or that has at least a certain relevance to the one piece of link data.

3. The travel time data processing apparatus according to claim 1, wherein
each piece of the link data includes road level information that defines a road level, and
the travel time data processor selects the other piece of link data out of target pieces of link data having an identical road level with a road level of the one piece of link data.

4. A travel time data processing method of calculating a travel time of a road based on information sent from an information terminal, the travel time data processing method comprising:
causing a computer to obtain probe information from each apparatus traveling on a road;
causing the computer to store the probe information into a probe information storage;
causing the computer to use the probe information and calculate a travel time that is a time period required for traveling, with regard to each road corresponding to each piece of link data that is included in road network data stored in a road network data storage; and
causing the computer to:
when a time zone of statistical data of one piece link data has a number of probe information that is insufficient for calculating a travel time of the road represented by the one piece of link data:
select another piece of link data that satisfies a predetermined condition relative to the one piece of link data,
select a time zone of statistical data of the other piece of link data that is identical to the time zone of statistical data of the one piece of link data,
search statistical data of the other piece of link data for another time zone of statistical data that has similar statistical data to statistical data of the selected time zone of statistical data of the other piece of link data,
select the other time zone of statistical data of the other piece of link data that has the similar statistical data, and
add a number of probe information in the selected other time zone of statistical data of the other piece of link data to the number of probe information in the time zone of statistical data of the one piece of link data that has the number of probe information that is insufficient.

5. A non-transitory computer readable medium staring a program configured to calculate a travel time of a road based on information sent from an information terminal, the program being executed by a computer, the program causing the computer to implement the functions of:
obtaining probe information from each apparatus traveling on a road;
storing the probe information into a probe information storage;
using the probe information and calculating a travel time that is a time period required for traveling, with regard to each road corresponding to each piece of link data that is included in road network data stored in a road network data storage; and
when a time zone of statistical data of one piece link data has a number of probe information that is insufficient for calculating a travel time of the road represented by the one piece of link data:
selecting another piece of link data that satisfies a predetermined condition relative to the one piece of link data,
selecting a time zone of statistical data of the other piece of link data that is identical to the time zone of statistical data of the one piece of link data,
searching statistical data of the other piece of link data for another time zone of statistical data that has similar statistical data to statistical data of the selected time zone of statistical data of the other piece of link data,
selecting the other time zone of statistical data of the other piece of link data that has the similar statistical data, and
adding a number of probe information in the selected other time zone of statistical data of the other piece of link data to the number of probe information in the time zone of statistical data of the one piece of link data that has the number of probe information that is insufficient.

* * * * *